United States Patent [19]  [11] 3,735,922
Fujiwara  [45] May 29, 1973

[54] COMBINATION AIR VENT-VACUUM BREAKER

[76] Inventor: Katsuji Fujiwara, 191 Nishitani, Hiraoka-cho, Kakogawa-shi, Hyogo, Japan

[22] Filed: Feb. 7, 1972

[21] Appl. No.: 224,183

[30] Foreign Application Priority Data

Feb. 10, 1971 Japan............................46/5708
March 31, 1971 Japan...........................46/19506

[52] U.S. Cl. .......................236/66, 236/87, 236/101
[51] Int. Cl. ...............................................F16t 1/44
[58] Field of Search..........................236/66, 101, 87

[56] References Cited

UNITED STATES PATENTS 1,291,099  1/1919  Ostrander...............................236/66
2,461,903  2/1949  Kurtz....................................236/101
2,431,153  11/1947  White...................................236/101

Primary Examiner—William E. Wayner
Assistant Examiner—William E. Tapolcai, Jr.
Attorney—David Toren et al.

[57] ABSTRACT

A combination air vent-vacuum breaker such as is employed in a system using steam, is formed of a main body member and a cover member attached to and combining with the body member to form a pressure chamber. The main body member contains an inlet port and an outlet port which communicate with the pressure chamber and has a surface facing the pressure chamber which provides an inner annular valve seat and an outer annular valve seat. A disc valve, positioned within the pressure chamber, is movably displaceable relative to the valve seats to regulate flow between the inlet and outlet ports. Further, a bi-metal ring and a support member with a slanted surface are associated with the main body member and cooperate in opening and closing flow between the inlet and outlet ports as the bi-metal ring expands and contracts. Further, the construction of the air vent-vacuum breaker assures that any vacuum developed in the system during its operation can be broken immediately, any condensate in the system in the system at shutdown can be discharged and any dirt clogging operation of the valve disc can be blown clear.

8 Claims, 5 Drawing Figures

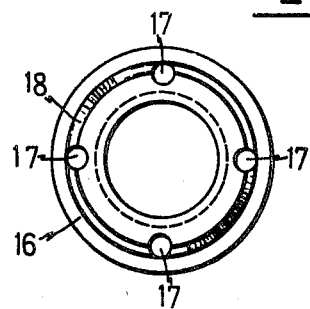
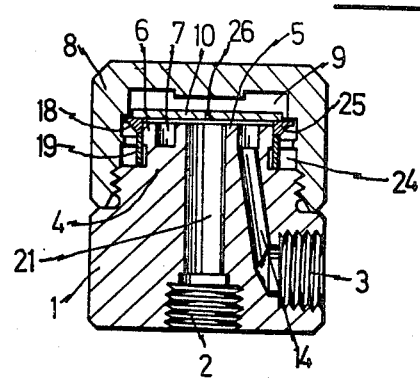
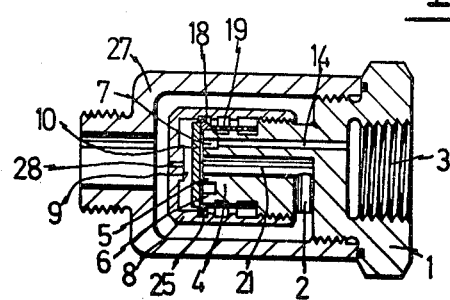

COMBINATION AIR VENT-VACUUM BREAKER

BACKGROUND OF THE INVENTION

In the past systems using steam have employed valves as vacuum breakers and such valves usually have a valve body which is loaded in the opening direction by a spring, and, during operation, the spring is compressed by the action of the fluid pressure and biases the valve body against its valve seat for maintaining the valve in the closed position. When a vacuum is developed in such a system, the spring biases the valve body away from its seat, opening the valve, and breaking the vacuum. Accordingly, such valves serve only as vacuum breakers and, if at the time the valve is being closed, any dirt clogs or interferes with the closing action, the valve is maintained in a half-opened state and cannot be closed properly. As a result, the valve must be opened and cleaned before it will operate in a proper manner.

SUMMARY OF THE INVENTION

The present invention is directed to a valve member which operates as a combination air vent-vacuum breaker and, more particularly, it is directed to a valve construction which uses a bi-metal ring in combination with a slanting surface for effecting the opening and closing action of the valve member.

The combination air vent-vacuum breaker valve member, to which the present invention is directed, is used in steam traps, steam using equipment, steam piping and the like for promptly discharging air at start up, for breaking any vacuum developed in the system such as due to a rapid increase in load or a rapid drop in the supply pressure on the inlet side of the valve. Accordingly, the performance of the steam using system or member is improved and difficulties stemming from the development of a vacuum are avoided.

Therefore, in accordance with the present invention, a valve member is provided which serves concurrently as an air vent and a vacuum breaker. The combined air vent-vacuum breaker assures the positive and prompt discharge of air from a steam using system during start up and affords a positive closure of the valve member when steam flows into it. In the event any dirt clogs or blocks the operation of the valve member, it can be automatically eliminated. In the event a vacuum is developed within the system, the valve member operates immediately to break the vacuum and, further, at shut-down the discharge of condensate is assured as is the breaking of any vacuum which might develop at that time.

In accordance with the present invention, the valve member is formed of a main body member and a cover member which combine in the formation of a pressure chamber. The surface of the main body member facing into the pressure chamber forms an inner annular valve seat and an outer annular valve seat with an annular groove between the two. Within the pressure chamber a disc valve is positioned so that it is movably displaceable toward and away from the surface of the main body member containing the annular valve seats. In addition, a pilot valve is provided in the disc valve and is arranged to open and close due to pressure changes in the pressure chamber and on the side of an inlet port extending through the main body member, so that communication between the pressure chamber and the inlet port can be effected and broken. Further, a member, such as a bushing, is inserted into the annular groove between the inner and outer annular valve seats and in combination with the groove forms an annular space connected to a discharge passageway which opens to the outlet port. The member contains a plurality of holes at its periphery which connect the annular space with the pressure chamber. Additionally, the member is provided with a slanting surface which supports a bi-metal ring that expands and contracts in the diametrical direction of the ring. Further, another member is associated with the bi-metal ring so that as it expands and contracts moving along the slanted surface of the member the movement of the ring is translated into an axial movement for opening and closing the disc valve.

At start-up, the disc valve is spaced from the inner and outer annular valve seats by the position of the bi-metal ring, and any air within the system is promptly discharged due to the open condition of the valve member. When steam flows into the valve member, the expansion of the bi-metal ring effects a release of the disc valve and closes the valve according to the principle of a disc type trap in accordance with Bernoulli's theorem. In this condition, the pressure at the inlet side of the valve member and in the pressure chamber becomes equalized and the pilot valve associated with the disc valve drops due to its own weight and a connection is provided between the inlet side of the valve member and the pressure chamber through a pilot valve port. Under these conditions, the disc valve is retained in the closed position. Further, when the valve is being closed if any dirt blocks the closure of the disc valve with its seat, the pressure within the pressure chamber will drop suddenly and the pilot valve will be attracted into the closed position with its valve seat and the pressure in the pressure chamber will drop even further with the result that the disc valve will open and any dirt causing a blockage will be blown clear by the outflowing fluid and the blockage will be automatically eliminated.

If a vacuum is formed in the system containing the valve member due to a sudden increase in the load or a sudden decrease in the inlet pressure, the pilot valve located in the disc valve opens and, since the pilot valve port is of a relatively large size, a vacuum is formed in the pressure chamber and the disc valve is immediately opened due to the pressure on the outlet side of the valve member, accordingly, the air on the outlet side is introduced into the system and eliminates the vacuum. As the air flowing through the valve member from the outlet side passes into the inlet side, it flows over the bi-metal ring and causes it to cool so that a contracting action takes place and the bi-metal ring positions itself so that any closing action of the disc valve is prevented.

Moreover, when shut-down of the system takes place, any vacuum is broken in a similar manner and any condensate which remains in the system is discharged, thus damage resulting from freezing of retained condensate is avoided.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 3 is an enlarged plan view of one of the members of the valve member shown in FIGS. 1 and 2; and FIGS. 4 and 5 are axially extending sectional views of valve members illustrating other embodiments of the invention.

DETAILED DESCRIPTION OF THE INVENTION

Figure 1:
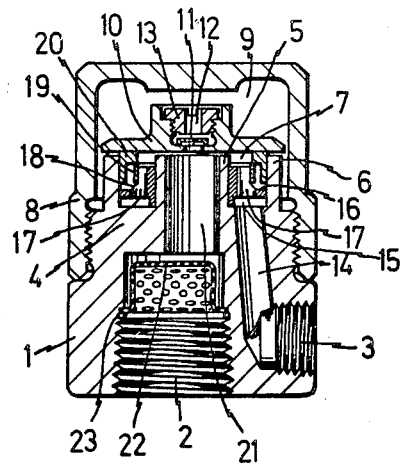
FIG. 1 is an axially extending sectional view of a combination air vent-vacuum chamber valve member embodying the present invention and illustrating the condition of the valve member at shut-down.
Figure 2:
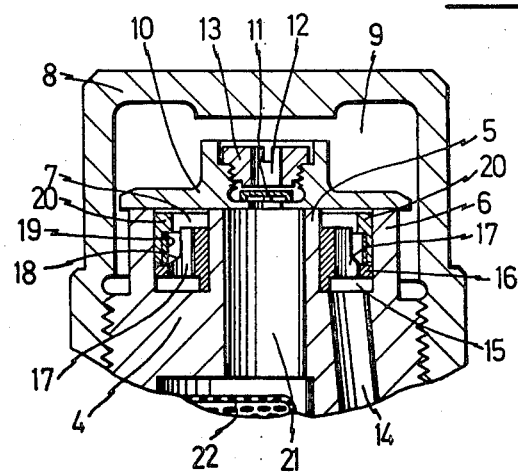
FIG. 2 is an enlarged partial sectional view, similar to that shown in FIG. 1, with the valve member in the closed condition.

In FIGS. 1 and 2 a valve member is shown consisting of an axially extending main body member 1 having an inlet port 2, an outlet port 3 spaced from said inlet port, and a valve seat surface 4 extending transversely of the axial direction of the main body member. The valve seat surface 4 has an inner valve seat 5, an outer annular valve seat 6 spaced radially outwardly from the inner valve seat, and an annular groove 7 positioned between the two valve seats 4 and 5. Threaded onto the main body member 1 is a cover member 8 having its transverse surface spaced outwardly from the valve seat surface 4 so that the cover member and main body portion combine to form a pressure chamber 9. Within the pressure chamber 9, a disc valve 10 is displaceably positioned between a closed position in contact with the valve seat surface 4 and an open position spaced from the valve seat surface. Centrally located within the disc valve is a pilot valve port 12 which can be closed by a pilot valve 11 in accordance with the pressure conditions within the pressure chamber and on the inlet port side of the disc valve. A pilot valve seat 13 is located within the disc valve and the pilot valve is displaceable toward and away from the pilot valve seat for effecting the opening and closing of the passageway through the pilot valve port.

Arranged within the annular groove 7 is a bushing 16 which is shaped so that an annular space 15 is formed in the bottom of the annular groove which communicates through a discharge passage 14 with the outlet port 3 in the main body member 1. As indicated in FIG. 3, a number of throughholes 17 extend in the axial direction of the main body member through the bushing for connecting the annular space 15 with the pressure chamber 9. As can be seen in FIGS. 1 and 2, a frusto-conically shaped slanted surface 18 is provided on the outwardly facing periphery of the bushing 16 and a bi-metal ring 19 is supported on the slanted surface 18. Due to its construction, the bi-metal ring 19 expands and contracts in the diametrical direction due to temperature changes which take place within the annular groove 7. Also located within the annular groove 7 is a sleeve member 20 which extends radially inwardly from the outer side of the annular groove over the top of the bi-metal ring so that it prevents the ring from riding upwardly out of the annular groove.

The bi-metal ring 19 is formed of two metal sections each having a different coefficient of thermal expansion and with the section having the larger coefficient located at the inner portion of the ring so that it causes the ring to expand when it is exposed to high temperatures and to contract when it is exposed to low temperatures.

The inlet port 2 is spaced from the valve seat surface 4 of the main body member 1 and is connected to it by a inflow passage 21. Further, a screen is positioned in the inlet port 2 adjacent the inflow passage 21 and the screen is held in position by a snap ring 23.

The embodiment of the invention shown in FIGS. 1 to 3 operates in the manner which is described as follows.

In FIG. 1 the position of the bi-metal ring 19 is shown at start up conditions when it is in its contracted condition due to exposure to low temperature. In its contracted condition the bi-metal ring 19 rests on the inner and upper end of the slanted surface 18 and it maintains the sleeve 20 in an upper position so that its upper surface extends above the valve seat surface 4 and maintains the disc valve in a spaced position from the inner and outer annular valve seats 5, 6. As a result, the valve member is in an opened condition and any air passes from the inlet port through the inflow passage 21 then through the annular groove 7 and the discharge passage 14 to the outlet port 3. Due to the flow through the main body member, the pilot valve 11 is urged upwardly against the pilot valve seat 13 causing it to close.

As steam flows into the valve member it passes through the annular groove 7 and flows over the bi-metal ring 19 causing it to become heated and to expand diametrically outwardly. As the ring 19 expands its lower end supported on the slanted surface 18 moves outwardly and downwardly along the slanted surface with the result that the upper end of the sleeve drops gradually until it is located below the plane of the valve seat surface 4 and is spaced from the disc valve 10. As a result, the disc valve rests against the inner annular valve seat 5 and the outer annular valve seat 6 closing off any flow to the outlet port 3. The position of the disc valve 10 when the bi-metal ring 19 is in its expanded condition is shown in FIG. 2 and the valve member is closed in accordance with the principle of the disc type trap.

With the disc valve seated on the valve seat surface 4, the pressure in the pressure chamber 9 becomes equal to the pressure on the side of the inlet port and the pilot valve 11 will drop downwardly due to its own weight and open the pilot valve port 12 so that the pressure chamber and the inflow passage 21 are in communication with one another and the disc valve is held against the valve seat surface 4 in the closed position.

If, during operation, a vacuum is developed within the system due to a sudden increase in the load or a sudden drop in the inlet pressure, the pilot valve is drawn to the inlet passage side of the pilot valve so that it is opened and the vacuum is established within the pressure chamber. In this condition the disc valve opens automatically due to the atmospheric pressure on the side of the outlet port and air flows into the system so that the vacuum is broken. Further, at this stage the bi-metal ring 19 is in the expanded condition within the annular groove 7 and as the outlet air flows into the valve member, it passes through the holes 17 over the surface of the ring and the bushing providing a cooling effect whereby the bi-metal ring contracts inwardly and moves upwardly along the slanted surface 18 of the bushing. The radially inwardly directed movement of the bi-metal ring causes the sleeve 20 to be raised until it projects above the plane of the valve seat surface 4, such as shown in FIG. 1, with the disc valve spaced upwardly from the valve seat surface. Accordingly, when normal operation of the system is resumed, the air which has passed into the valve member again flows outwardly and the inflow of steam again causes the valve member to assume the position shown in FIG. 2.

When the disc valve is seated against the valve seat surface and any dirt or foreign objects on the valve seat surface block the proper seating of the disc valve, the pilot valve 11 is biased toward the pilot valve seat 13 due to a sudden drop in the pressure within the pressure chamber and closes the pilot valve, with the result that the pressure within the pressure chamber is further reduced and the disc valve 10 is forcibly opened so that the dirt or foreign objects are blown clear of the valve seat surface permitting the disc valve to seat properly. Therefore, an automatic operation is provided to assure that any material blocking the closure of the disc valve with the valve seat surface is eliminated.

At shut-down of the system, the bi-metal ring is cooled and, as a result, contracts due to the drop in pressure and temperature on the inlet side of the valve member. As explained above, as the ring contracts it causes an axial thrust in the direction of the valve seat surface and the sleeve 20 pushes upwardly against the disc valve displacing it into the open position. Accordingly, any vacuum within the system is broken and any condensate which remains in the system is automatically discharged so that the possibility of freezing of the condensate is avoided.

In the embodiment just described, the bi-metal ring expands when exposed to high temperatures and contracts when exposed to low temperatures, however, if a bi-metal ring is used formed of two sections having different coefficients of thermal expansion and the section having the larger coefficient of thermal expansion is located on the outer surface of the ring then a similar effect can be obtained by reversing the slanted surface 18 of the bushing and the same effect can be achieved in opening and closing the disc valve.

In another arrangement of the bi-metal ring 19, as shown in FIG. 4, it can be positioned in an annular space between the outer annular valve seat 6 on the main body member 1 and the juxtaposed inside surface of the cover member. In this embodiment, the frustoconical surface, which is necessary to effect the translation of the diametric movement into an axial movement, is arranged on the undersurface of an annular member 25 which is located above the upper end of the bi-metal ring. However, the slanted surface can be formed directly on the side of the outer annular valve seat 6 and a flat annular member 25 can be used.

In the embodiment shown in FIG. 4, the disc valve has a throughhole 26 which provides communication between the pressure chamber 9 and the inflow passageway 21 connected to the inlet port 2 of the valve member. As a result, when the valve is in its closed position the pressure chamber is in communication with the inlet port side of the valve member.

In FIG. 5 still another embodiment is illustrated in which a cap is provided which can be directly screwed or threaded onto piping and the like. In this embodiment the cover member 8 is provided with a throughhole 28 which communicates between the pressure chamber 9 and the inlet port side of the valve member.

Therefore, an air vent is provided which at the same time serves as a vacuum breaker and is characterized in that at start-up, air is promptly discharged through the valve member. When steam is introduced into the system, a positive valve closing action is obtained and if any dirt happens to clog the closure of the valve it can be automatically cleared. Further, during operation, if a vacuum should develop, the disc valve is immediately opened due to the pressure on the outlet port side of the valve member causing the vacuum to be broken. Finally, when the system is shut down, any condensate contained in it is positively discharged so that freezing of the condensate is avoided thereby eliminating any damage to the system from that particular problem. Accordingly, due to the valve member arrangement provided by the present invention and improved construction is provided which is of considerable industrial significance.

While specific embodiments of the invention have been shown and described in detail to illustrate the application of the inventive principles, it will be understood that the invention may be embodied otherwise without departing from such principles.

What is claimed is:

1. A valve member serving as a combination air vent-vacuum breaker and comprising an axially extending main body portion including an inlet port, an outlet port spaced from said inlet port and a valve seat surface extending transversely of the axial direction of said main body portion, a cover member secured to said main body portion and forming in combination with said valve seat surface a pressure chamber, a disc valve disposed transversely of the axial direction of said main body portion and displaceably positioned within said pressure chamber for movement between a contacting position with said valve seat surface and at least one other position spaced from said valve seat surface, said main body portion including an inlet passage extending between said inlet port and said valve seat surface and communicating with said pressure chamber, said valve seat surface having an inner annular valve seat and an outer annular valve seat with said inner annular valve seat encircling said inlet passage extending through said valve seat surface and said outer annular valve seat encircling said inner annular valve seat, said valve seat surface having an annular groove disposed between said inner and outer annular valve seats and having its opening facing toward said pressure chamber, said main body portion having a discharge passage connecting said annular groove with said outlet port, means supported by said main body portion for axially displacing said disc valve, said means comprising a bi-metal ring having its axis disposed in parallel with the axis of said main body portion and being expandible and contractible in its diametrical direction, and a member having a slanted surface disposed at an acute angle to the axis of said main body portion with said bi-metal ring supported at one transverse end thereof on said slanted surface so that as said bi-metal ring expands and contracts it moves on said slanted surface transversely of the axial direction of said main body part for converting the expanding and contracting action of said bi-metal ring through said means into axial displacement of said disc valve.

2. A valve member, as set forth in claim 1, wherein said disc valve has a throughhole communicating between said valve seat surface on said main body portion and said pressure chamber, a pilot valve displaceably mounted in said through-hole for opening and closing flow therethrough in response to pressure changes on said valve seat surface side of said disc valve which communicates with said inlet port and on said pressure chamber side of said disc valve.

3. A valve member, as set forth in claim 1, wherein said means comprises a bushing positioned within said annular groove in said valve seat surface, said bushing having the slanted surface formed on its radially outwardly facing surface so that it slopes outwardly in diverging relationship in the direction extending axially away from said disc valve, and said bi-metal ring arranged to be supported in its contracted condition on said slanted surface closer to said disc valve and to ride radially outwardly on said slanted surface as it expands so that it moves axially away from said disc valve.

4. A valve member, as set forth in claim 1, wherein said main body portion is spaced inwardly from said cover member at a location spaced outwardly from said outer annular valve seat and forms therebetween an annular space, said means comprises an annular member positioned within said annular space, said annular member having said slanted surface formed thereon on the side facing away from said disc valve, and said bi-metal ring positioned within said annular space in contact with said slanted surface.

5. A valve member, as set forth in claim 3, wherein said bushing is positioned within said annular groove so that it forms an annular space defined between the bottom of said annular groove and the bottom of said bushing within said annular groove so that said annular space is separated from said pressure chamber by said bushing, and said bushing having a plurality of axially extending holes therethrough affording communication between said annular space and said pressure chamber.

6. A valve member, as set forth in claim 3, wherein said means comprises a sleeve positioned within said annular groove radially outwardly from said slanted surface on said bushing, the opposite end of said bi-metal ring from the end contacting said slanted surface is in contact with said sleeve, and said sleeve being shaped so that it remains in contact with said bi-metal ring over the full range of expansion and contraction of said bi-metal ring.

7. A valve member, as set forth in claim 4, wherein said annular member is shaped so that it retains said bi-metal ring within said annular space over the full range of expansion and contraction of said bi-metal ring.

8. A valve member, as set forth in claim 1, wherein said disc valve has a diameter at least equal to the outside diameter of said annular valve seat.

* * * * *